US012748242B2

(12) United States Patent
Lee et al.

(10) Patent No.: US 12,748,242 B2
(45) Date of Patent: Sep. 29, 2026

(54) WET ETCHING COMPOSITION FOR ETCHING A GLASS COMPRISING HYDROFLUORIC ACID, OXALIC ACID, ACETIC ACID, AND A SURFACTANT, WET ETCHING METHOD OF A GLASS, AND PATTERNED GLASS BY THE WET ETCHING METHOD

(71) Applicants: Sang-Ro Lee, Gyeonggi-do (KR); Katsushi Igarashi, Tokyo (JP)

(72) Inventors: Sang-Ro Lee, Gyeonggi-do (KR); Katsushi Igarashi, Tokyo (JP)

(73) Assignee: Power Support Co., Ltd., Tokyo (JP)

( * ) Notice: Subject to any disclaimer, the term of this patent is extended or adjusted under 35 U.S.C. 154(b) by 120 days.

(21) Appl. No.: 17/641,410

(22) PCT Filed: Oct. 19, 2021

(86) PCT No.: PCT/KR2021/014601
§ 371 (c)(1),
(2) Date: Mar. 8, 2022

(87) PCT Pub. No.: WO2023/068395
PCT Pub. Date: Apr. 27, 2023

(65) Prior Publication Data
US 2024/0045108 A1 Feb. 8, 2024

(51) Int. Cl.

| | |
|---|---|
| ***G02B 1/118*** | (2015.01) |
| ***C03C 15/00*** | (2006.01) |
| ***C03C 23/00*** | (2006.01) |
| ***C09K 13/08*** | (2006.01) |

(52) U.S. Cl.
CPC .............. *G02B 1/118* (2013.01); *C03C 15/00* (2013.01); *C03C 23/0075* (2013.01); *C03C 23/0085* (2013.01); *C09K 13/08* (2013.01)

(58) Field of Classification Search
CPC ............................ C03C 23/0085; C09K 13/04
See application file for complete search history.

(56) References Cited

U.S. PATENT DOCUMENTS

| | | | | |
|---|---|---|---|---|
| 2008/0041823 | A1* | 2/2008 | La | H01L 21/31111 252/79.3 |
| 2019/0364665 | A1* | 11/2019 | Yang | C09K 13/04 |
| 2022/0293656 | A1* | 9/2022 | Kurihara | H04N 25/70 |

FOREIGN PATENT DOCUMENTS

| | | | | |
|---|---|---|---|---|
| CN | 107857481 A * | 3/2018 | | C03C 15/00 |
| CN | 109564867 A * | 4/2019 | | G03F 1/80 |
| JP | 2005227699 A * | 8/2005 | | |
| KR | 1020080071708 A | 8/2008 | | |

(Continued)

OTHER PUBLICATIONS

International Search Report issued on Jul. 8, 2022.

*Primary Examiner* — Paul C Lee
(74) *Attorney, Agent, or Firm* — Apex Juris, pllc; Tracy M Heims

(57) ABSTRACT

A wet etching method according to the present disclosure includes cleaning the glass, forming a nanoscale pattern by wet-etching the cleaned glass, and cleaning and drying the nano-patterned glass, wherein a wet etching solution used in the wet etching includes hydrofluoric acid and a surfactant. According to the present disclosure, a glass having high transmittance/low reflectance can be provided. The glass can be applied to an optical device and a display including a mobile device.

13 Claims, 10 Drawing Sheets

(56) References Cited

FOREIGN PATENT DOCUMENTS

| | | | |
|---|---|---|---|
| KR | 1020120044408 | A | 5/2012 |
| KR | 1020150114059 | A | 10/2015 |
| KR | 1020170096724 | A | 8/2017 |
| KR | 20180016887 | A | 2/2018 |
| KR | 101842083 | B1 | 3/2018 |

* cited by examiner

| Name | %T(350.00nm) | %T(400.00nm) | %T(500.00nm) | %T(550.00nm) | %T(600.00nm) | %T(700.00nm) | %T(750.00nm) | %T(800.00nm) |
|---|---|---|---|---|---|---|---|---|
| Before AR 1 | 87.1466 | 91.8224 | 91.9867 | 92.1762 | 91.9777 | 91.3539 | 91.0436 | 90.6351 |
| Before AR 2 | 87.2097 | 91.2704 | 91.7103 | 92.0183 | 91.8449 | 91.3854 | 91.2184 | 90.9091 |
| Before AR 3 | 87.591 | 92.125 | 92.3785 | 92.1237 | 91.954 | 91.4687 | 91.1156 | 90.7159 |
| After AR 1 | 90.7918 | 96.0928 | 97.4324 | 97.1001 | 96.5718 | 95.8113 | 95.36 | 94.5655 |
| After AR 2 | 90.7411 | 96.528 | 97.8792 | 97.6449 | 97.0465 | 96.4761 | 95.8153 | 94.9686 |
| After AR 3 | 90.5292 | 96.0924 | 97.1706 | 96.9064 | 96.3109 | 95.3007 | 94.8671 | 94.1955 |

| Name | %T(350.00nm) | %T(400.00nm) | %T(500.00nm) | %T(550.00nm) | %T(600.00nm) | %T(700.00nm) | %T(750.00nm) | %T(800.00nm) |
|---|---|---|---|---|---|---|---|---|
| Before AR 1 | 88.3131 | 91.4825 | 92.1074 | 91.9143 | 91.8559 | 91.3639 | 91.0034 | 90.6969 |
| Before AR 2 | 88.4965 | 91.5731 | 92.0253 | 92.0615 | 92.1485 | 91.6135 | 91.3353 | 91.0525 |
| Before AR 3 | 88.7528 | 91.7384 | 92.1918 | 92.1651 | 92.1322 | 91.5811 | 91.3902 | 91.0328 |
| After AR 1 | 90.7682 | 95.5075 | 96.5854 | 96.3199 | 95.8896 | 94.7676 | 94.1115 | 93.3723 |
| After AR 2 | 90.7466 | 95.0974 | 96.4218 | 96.2673 | 95.8001 | 94.467 | 93.6885 | 92.7352 |
| After AR 3 | 91.187 | 95.367 | 96.532 | 96.2053 | 95.6533 | 94.3116 | 93.5691 | 92.7635 |

| Name | %T(350.00nm) | %T(400.00nm) | %T(450.00nm) | %T(500.00nm) | %T(550.00nm) | %T(600.00nm) | %T(650.00nm) | %T(700.00nm) | %T(750.00nm) |
|---|---|---|---|---|---|---|---|---|---|
| Before AR 1 | 89.175 | 90.4598 | 91.7343 | 91.2343 | 91.7343 | 91.6763 | 91.9794 | 91.6636 | 91.7702 |
| Before AR 2 | 88.3075 | 90.2893 | 91.3157 | 90.8941 | 91.3157 | 91.6342 | 91.2813 | 91.8406 | 92.0948 |
| Before AR 3 | 90.039 | 91.5021 | 91.5721 | 91.1377 | 91.5721 | 91.5299 | 90.8427 | 90.9845 | 90.9529 |
| After AR 1 | 92.4249 | 94.4135 | 95.9956 | 95.9024 | 95.9956 | 95.3719 | 94.9337 | 94.3631 | 93.5629 |
| After AR 2 | 94.7263 | 95.5173 | 95.3003 | 95.4528 | 95.3003 | 94.6039 | 92.8566 | 92.2599 | 91.0154 |
| After AR 3 | 94.1795 | 94.2937 | 95.2854 | 95.3912 | 95.2854 | 94.7593 | 93.4146 | 92.136 | 91.5104 |

| Name | %T(350.00nm) | %T(400.00nm) | %T(450.00nm) | %T(500.00nm) | %T(550.00nm) | %T(600.00nm) | %T(650.00nm) | %T(700.00nm) | %T(750.00nm) |
|---|---|---|---|---|---|---|---|---|---|
| Before AR 1 | 89.5222 | 91.0288 | 91.9122 | 91.3743 | 91.9122 | 92.3738 | 92.503 | 92.766 | 92.5237 |
| Before AR 2 | 89.5216 | 91.1074 | 92.0242 | 91.8629 | 92.0242 | 92.1115 | 91.7857 | 92.1722 | 91.9073 |
| Before AR 3 | 89.8595 | 91.2619 | 97.7797 | 91.0306 | 91.7797 | 91.8981 | 91.7699 | 91.4782 | 91.3327 |
| After AR 1 | 99.4253 | 98.3387 | 98.3303 | 98.261 | 98.3303 | 97.3692 | 95.9237 | 94.6115 | 93.385 |
| After AR 2 | 98.7585 | 99.047 | 98.1328 | 98.0587 | 98.1328 | 96.8581 | 95.385 | 93.7925 | 92.2121 |
| After AR 3 | 99.1566 | 98.731 | 98.2462 | 98.3919 | 98.2462 | 97.1441 | 95.991 | 94.4074 | 92.9457 |

| Name | %T(300.00nm) | %T(350.00nm) | %T(400.00nm) | %T(500.00nm) | %T(550.00nm) | %T(600.00nm) | %T(700.00nm) | %T(750.00nm) | %T(800.00nm) |
|---|---|---|---|---|---|---|---|---|---|
| Before AR 1 | 36.0403 | 87.2168 | 91.4128 | 91.7549 | 91.6765 | 91.6932 | 91.4334 | 91.2957 | 91.1229 |
| t : 2min | 36.783 | 88.584 | 92.9519 | 93.2897 | 93.2133 | 93.0958 | 92.7425 | 92.5467 | 92.2198 |
| t : 3min | 36.8934 | 89.7394 | 93.9462 | 94.5332 | 94.4183 | 94.4734 | 94.0403 | 94.0057 | 94.1058 |
| t : 4min | 37.2451 | 90.8101 | 95.3232 | 96.3243 | 96.0194 | 95.4398 | 94.4565 | 93.8421 | 93.2495 |
| t : 5min | 37.4517 | 90.0726 | 94.7193 | 95.7149 | 95.6509 | 95.1759 | 93.6887 | 92.8474 | 92.0026 |
| t : 6min | 38.5323 | 91.2726 | 93.8385 | 92.8369 | 92.8864 | 93.2364 | 92.9564 | 92.6152 | 92.2736 |
| t : 7min | 37.5823 | 91.1609 | 93.3863 | 91.9498 | 92.128 | 92.5541 | 92.996 | 92.9673 | 92.9451 |

(a)

(b)

(a)

(b)

WET ETCHING COMPOSITION FOR ETCHING A GLASS COMPRISING HYDROFLUORIC ACID, OXALIC ACID, ACETIC ACID, AND A SURFACTANT, WET ETCHING METHOD OF A GLASS, AND PATTERNED GLASS BY THE WET ETCHING METHOD

TECHNICAL FIELD

The present disclosure relates to a wet etching method of a glass, in which nano-patterns are formed on the surface of glass by wet etching to improve light transmittance of glass and lower reflectance of glass.

BACKGROUND ART

Etching processes may be classified into wet etching and dry etching. The wet etching is generally performed through a chemical reaction between a base material to be etched and an etching solution having a property of corroding and dissolving the base material. The dry etching is performed using a reaction by gas plasma or activated gas.

In a conventional method for surface treatment of a base material, the aforementioned dry etching is used to form a pattern having a width (thickness) of several nanometers to several tens of nanometers. However, the dry etching is expensive and process management and mass-production are difficult, compared with the wet etching. In addition, the dry etching is difficult to apply to curved glass and large-area glass due to characteristics of the process.

On the other hand, in the case of a conventional wet etching, process management and mass-production are easy, compared with the drying etching. However, a pattern formed through the wet etching has an average width of 3 micrometers or more. Such a pattern may lower reflectance, but has a disadvantage in that transmittance is remarkably reduced. Therefore, a need for a fine nano-pattern capable of lowering reflectance while maintaining transmittance has emerged. However, the wet etching method has difficulty in implementing a nanoscale pattern to the extent that the light reflectance or transmittance can be controlled, and the conventional wet etching has hardly provided glass having high light transmittance/low light reflectance.

The inventors have conducted research and development based on these technical circumstances and have applied for Korean Patent Registration No. 10-1842083, entitled "Method for Forming Protrusion". According to the related art, it is possible to obtain an effect of improving transmittance and lowering reflectance. However, there are still problems in the stability, reproducibility, and etch uniformity of an etching reaction.

Therefore, the inventors continued further research and development to reach the present invention.

DISCLOSURE OF THE INVENTION

Technical Problem

The present disclosure aims to provide a glass having high transmittance/low reflectance.

The present disclosure aims to enable high transmittance/low reflectance processing for various surfaces of glass.

The present disclosure aims to provide a glass having high transmittance/low reflectance, in which the stability, reproducibility, and etching uniformity of an etching reaction are improved.

Technical Solution

A wet etching method according to the present disclosure includes cleaning the glass, forming a nanoscale pattern by wet-etching the cleaned glass, and cleaning and drying the nano-patterned glass.

A wet etching solution used in the wet etching may include hydrofluoric acid and a surfactant.

The wet etching may be performed by a dipping method.

The nanoscale pattern may be formed on both surfaces or one surface of the glass.

The nanoscale pattern may have a range of 1-100 nanometers.

The nanoscale pattern may include a protrusion protruding from a surface of the glass.

The surface of the glass may have a moth eye structure including the protrusion.

The nanoscale structure may include a protrusion.

The thickness of the protrusion may be greater than the depth of the protrusion.

The thickness of the protrusion may be 1-50 nanometers.

The depth of the protrusion may be 1-50 nanometers.

The thickness of the protrusion may be 5-30 nanometers.

The depth of the protrusion may be 5-30 nanometers.

A wet etching solution composition in the wet etching may include hydrofluoric acid and a surfactant and includes water as a remainder, the wet etching solution composition in the wet etching may include hydrofluoric acid and a surfactant, includes at least one of oxalic acid and acetic acid, and includes water as a remainder, the wet etching solution composition in the wet etching may include hydrofluoric acid and a surfactant, includes at least one of oxalic acid and acetic acid, does not include at least one of $NH_4F$, $HNO_3$, $H_3PO_4$, and HCl, and includes water as a remainder, the wet etching solution composition in the wet etching may include hydrofluoric acid and a surfactant, may include at least one of oxalic acid and acetic acid, may not include all of $NH_4F$, $HNO_3$, $H_3PO_4$, and HCl, and may include water as a remainder, the wet etching solution composition in the wet etching may include hydrofluoric acid and a surfactant, may further include oxalic acid and acetic acid, and may include water as a remainder, or the wet etching solution composition in the wet etching may include hydrofluoric acid and a surfactant, may further include oxalic acid and acetic acid, may not include all of $NH_4F$, $HNO_3$, $H_3PO_4$, and HCl, and may include water as a remainder.

The hydrofluoric acid may be included in an amount of greater than 0 wt % and less than 5.0 wt %.

The oxalic acid may be included in an amount of greater than 0 wt % and less than 5.0 wt %.

The acetic acid may be included in an amount of greater than 0 wt % of and less than 10.0 wt %.

The surfactant may be included in an amount of greater than 0 wt % and less than 1.0 wt %.

A wet etching temperature may be performed at 30-70° C.

An etching time may be performed for 1-7 minutes.

The glass may be used in a flat panel display including a mobile device and various optical devices.

A wet etching solution composition according to another aspect of the present disclosure is a wet etching solution composition for etching a glass. The wet etching solution composition may include hydrofluoric acid in an amount of greater than 0 wt % and less than 5.0 wt %, a surfactant in an amount of greater than 0 wt % and less than 1.0 wt %, and water as a remainder.

The composition may include oxalic acid in an amount of greater than 0 wt % and less than 5.0 wt %.

The composition may include acetic acid in an amount of greater than 0 wt % and less than 10.0 wt %.

The composition may include oxalic acid in an amount of greater than 0 wt % and less than 5.0 wt %, and acetic acid in an amount of greater than 0 wt % and less than 10.0 wt %.

The amount of the acetic acid may be larger than the amount of the oxalic acid.

The composition may not include at least one of $NH_4F$, $HNO_3$, $H_3PO_4$, and HCl.

The wet etching solution composition may not include all of $NH_4F$, $HNO_3$, $H_3PO_4$, and HCl.

A nano-patterned glass according to the present disclosure includes a pattern having nanoscale surface protrusions provided by a wet etching method to realize high transmittance/low reflectivity, and is applicable to a front panel of a flat panel display, a lens or a window of an optical device, or an encapsulating cover.

A thickness of the protrusion may be greater than a depth of the protrusion.

The thickness of the protrusion may be 1-50 nanometers.

The depth of the protrusion may be 1-50 nanometers.

The glass may be patterned on both surfaces or one surface.

Advantageous Effects

It is possible to provide a glass having high transmittance/low reflectance according to the present disclosure. A user may reduce the visibility reduction of a display due to the reflection of external light by using the glass of the present disclosure.

According to the present disclosure, there is an advantage that high transmittance/low reflectance processing is possible for the surface of the glass manufactured with various compositions that are confidentially managed by a manufacturer. In the present disclosure, it was confirmed through experiments that there was an effect of improving visibility by implementing high transmittance/low reflectance for, particularly, a display of a mobile device.

According to the present disclosure, it can be expected that the quality of the mobile device is improved through the improvement of the visibility of the display.

BRIEF DESCRIPTION OF THE DRAWINGS

FIGS. 9 and 10 are views describing an operation of a moth eye structure applied to an embodiment, wherein FIG. 9 shows the operation principle of the moth eye structure, and FIG. 10 is a view describing the operation of improving transmittance and reducing reflectance by the moth eye structure according to Example 4.

MODE FOR CARRYING OUT THE INVENTION

Hereinafter, specific embodiments of the present disclosure will be described in detail with reference to the drawings. However, the spirit of the present disclosure is not limited to the following embodiments, and those of ordinary skill in the art who understand the spirit of the present disclosure will be able to easily suggest other embodiments falling within the scope of the same idea by adding, changing, deleting, and adding components. This may also fall within the scope of the present disclosure.

Figure 1:
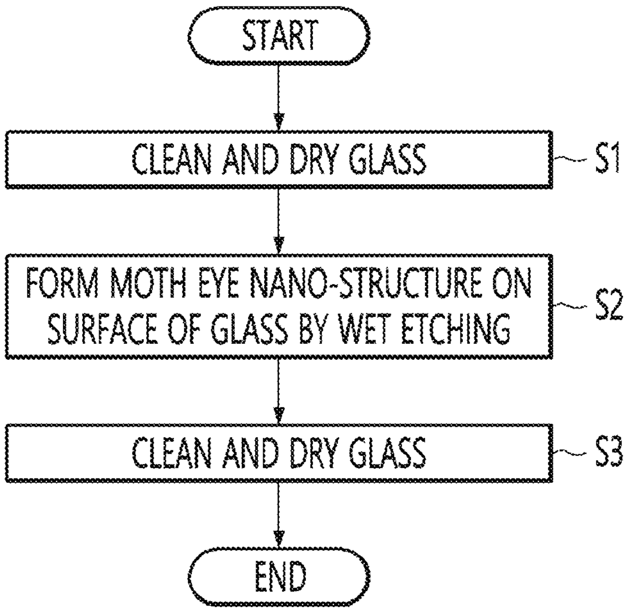
FIG. 1 is a flowchart describing a wet etching method of a glass according to an embodiment.

FIG. 1 is a flowchart describing a wet etching method of a glass according to an embodiment.

Referring to FIG. 1, the wet etching method of the glass may include a cleaning step S1 of cleaning a glass substrate, a pattern forming step S2 of forming a nano-pattern on the glass substrate through wet etching, and a cleaning/drying step S3 of cleaning and drying the patterned glass.

In the cleaning step S1, foreign matter such as organic matter present on the glass substrate may be removed. Due to the cleaning step S1, an etching process by an etching solution in the patterning step S2 may be uniformly performed on the entire glass substrate. In the washing step S1, isopropyl alcohol (IPA) or ethanol may be used. After the glass substrate is cleaned with IPA or ethanol, the glass substrate may be washed with water. As the cleaning method, ultrasonic waves or a brush may be used to clean the glass substrate.

The patterning step S2 may be performed by a dipping method of dipping the glass substrate in a wet etching solution or a spray method of spraying a wet etching solution onto the glass substrate. The nano-pattern may be provided on the glass substrate by the patterning step S2. Due to the dipping method, the pattern may be formed on both surfaces or one surface of the glass substrate. In the case of one surface, it may be performed using masking.

In this case, a wet etching solution composition may include hydrofluoric acid and a surfactant in an appropriate amount. The wet etching solution composition may include at least one of oxalic acid and acetic acid in an appropriate amount. The wet etching solution composition may not include at least one of $NH_4F$, $HNO_3$, $H_3PO_4$, and HCl. The wet etching solution composition may not include all of $NH_4F$, $HNO_3$, $H_3PO_4$, and HCl. In this case, the remainder of the composition may include water.

According to the patterning step, a nanoscale patterned structure in which unevenness is repeatedly implemented may be provided. The patterned structure may include nanoscale repeating protrusions. The nanoscale may refer to units of 1-100 nanometers. The protrusion may protrude from the surface of the glass. The protrusion may protrude in a height direction perpendicular to the surface of the glass.

The patterned structure is a nanoscale moth eye structure, and may lower light reflectance at an interface between the glass and another medium and sufficiently improve transmittance. Examples of the light may include visible light.

The glass may be used as a cover glass of a mobile device. In this case, the user of the mobile device may increase the visibility of display information of the mobile device by the high transmittance/low reflectance effect of the cover glass. Of course, the use example of the glass is not limited to the mobile device, and a preferable example may be a tempered glass of a mobile device. It is assumed that at least one of sodium and potassium is dispersed in the tempered glass.

In the step S3 of cleaning the glass, the glass may be cleaned and dried. In this step, the acidic etching solution remaining after the step S2 of forming the pattern through wet etching may be removed.

Table 1 is a table showing the wet etching solution composition.

TABLE 1

| Components of wet etching solution composition | Amount (wt %) |
|---|---|
| HF | 0< and <5.0 |
| $NH_4F$ | — |
| $HNO_3$ | — |
| $H_3PO_4$ | — |
| HCl | — |
| $C_2H_2O_4$ (oxalic acid) | 0< and <5.0 |
| $CH_3COOH$ (acetic acid) | 0< and <10.0 |
| Surfactant (surfactant) | 0< and <1.0 |
| $H_2O$ | Balance |

A description will be given with reference to Table 1.

The wet etching solution composition according to an embodiment may include hydrofluoric acid in an amount of greater than 0 wt % and less than 5.0 wt %. The wet etching solution composition according to an embodiment may include oxalic acid in an amount of greater than 0 wt % and less than 5.0 wt %. The wet etching solution composition according to an embodiment may include hydrofluoric acid in an amount of greater than 0 wt % and less than 5.0 wt %. The wet etching solution composition according to an embodiment may include a surfactant in an amount of greater than 0 wt % and less than 1.0 wt %. The remaining component of the entire etching solution may include water.

The wet etching solution composition according to an embodiment may include hydrofluoric acid in an amount of greater than 0 wt % and less than 5.0 wt % and a surfactant in an amount of greater than 0 wt % and less than 1.0 wt %. The remaining composition of the entire etching solution may include water. The inventors assume that oxides of sodium and potassium are homogeneously dispersed on the inside and on the surface of various commercially available glasses at a level suitable for making nanoscale unevenness. In this manner, it is assumed that nanoscale structures can be formed on the surface of the glass by including hydrofluoric acid.

The wet etching solution composition according to an embodiment may include hydrofluoric acid in an amount of greater than 0 wt % and less than 5.0 wt %, oxalic acid in an amount of greater than 0 wt % and less than 5.0 wt %, and a surfactant in an amount of greater than 0 wt % and less than 1.0 wt %. The remaining composition of the entire etching solution may include water.

The wet etching solution composition according to an embodiment may include hydrofluoric acid in an amount of greater than 0 wt % and less than 5.0 wt %, acetic acid in an amount of greater than 0 wt % and less than 10.0 wt %, and a surfactant in an amount of greater than 0 wt % and less than 1.0 wt %. The remaining composition of the entire etching solution may include water.

The wet etching solution composition according to an embodiment may include hydrofluoric acid in an amount of greater than 0 wt % and less than 5.0 wt %, and may include at least one of oxalic acid in an amount of greater than 0 wt % and less than 5.0 wt %, acetic acid in an amount of greater than 0 wt % and less than 10.0 wt %, and a surfactant in an amount of greater than 0 wt % and less than 1.0 wt %. The remaining composition of the entire etching solution may include water. In this case, when oxalic acid and acetic acid are included together, more acetic acid may be included.

By including at least one of oxalic acid and acetic acid in an appropriate amount, stability and reproducibility of the etching reaction may be improved. The appropriate amount of at least one of the oxalic acid and the acetic acid may be greater than 0 wt % and less than 5.0 wt %.

Preferably, the wet etching solution composition according to an embodiment may include hydrofluoric acid in an amount of greater than 0 wt % and less than 5.0 wt %, oxalic acid in an amount of greater than 0 wt % and less than 5.0 wt %, acetic acid in an amount of greater than 0 wt % and less than 10.0 wt %, and a surfactant in an amount of greater than 0 wt % and less than 1.0 wt %. The remaining composition of the entire etching solution may include water.

The wet etching solution composition according to an embodiment may necessarily include hydrofluoric acid in an amount of greater than 0 wt % and less than 5.0 wt %.

The hydrofluoric acid may form a nanoscale structure on the glass according to Formulae 1, 2, and 3.

$$Na_2O+2HF \rightarrow 2NaF+H_2O \quad \text{[Formula 1]}$$

$$K_2O+2HF \rightarrow 2KF+H_2O \quad \text{[Formula 2]}$$

$$SiO_2+6HF \rightarrow H_2SiF_6+2H_2O \quad \text{[Formula 3]}$$

Referring to Formulae above, the hydrofluoric acid may react with the oxides of sodium and potassium present in the glass to form NaF and KF. Since both NaF and KF are water-soluble, NaF and KF are dissolved in the etching solution.

$SiO_2$, which is the main component of the glass, may also react with HF to form $H_2SiF_6$, as shown in Formula 3. Since the reaction rate of Formula 3 is significantly lower than the reaction rate of Formulae 1 and 2, it is understood that the nanoscale uneven structure is formed by the difference in the reaction rate.

Since the $H_2SiF_6$ is also water-soluble, $H_2SiF_6$ is dissolved in the etching solution after the reaction. The formation of the nano-structure by the difference in the reaction rates of Formulae 1, 2, and 3 may form one feature of the present disclosure. Here, the nanoscale may correspond to both the thickness and the depth of the unevenness.

The wet etching solution composition according to an embodiment may include a surfactant. The surfactant may make corrosive substances well off from the surface of the glass substrate, form bubbles to well adsorb the corrosive substances, and make the active components of the wet etching solution in contact with the fine surface of the glass substrate well. The surfactant may make it possible to provide the nanoscale structure uniformly and smoothly over the entire surface of the glass.

The wet etching solution composition according to an embodiment may not include $NH_4F$, $HNO_3$, $H_3PO_4$, and HCl. $NH_4F$, $HNO_3$, $H_3PO_4$, and HCl were expected to play a large role in forming the nanoscale structures, but it was confirmed that $NH_4F$, $HNO_3$, $H_3PO_4$, and HCl caused problems in process stabilization, reproducibility, and uniformity of the nano-structure. It may be inferred that $NH_4F$, $HNO_3$, $H_3PO_4$, and HCl are due to poor reactivity with the surfactant.

The wet etching solution composition may be affected by a reaction time and a reaction temperature. The inventors were able to obtain various embodiments applicable as a product by performing countless repeated experiments. Various types of glass were used, and glass manufacturers do not disclose the composition and processing method of their glasses. Therefore, the inventors confirmed the performance of the wet etching solution composition through repeated experiments. A glass used as a front cover of a mobile device is an example of the glass.

Example 1 of wet etching method—A glass of S manufacturer, dipping etching, temperature of 30-40° C., etching time of 1-2 minutes Example 2 of wet etching method—B glass of S manufacturer, dipping etching, temperature of 60-65° C., etching time of 1.5-2 minutes Example 3 of wet etching method—A glass of X manufacturer, dipping etching, temperature of 65-70° C., etching time of 2-4 minutes Example 4 of wet etching method—A glass of C manufacturer, dipping etching, temperature of 65-70° C., etching time of 3-5 minutes Example 5 of wet etching method—C glass of S manufacturer, dipping etching, temperature of 40-45° C., etching time of 3.5-5 minutes The wet etching solution composition used at this time may include hydrofluoric acid in an amount of greater than 0 wt % and less than 5.0 wt %, oxalic acid in amount of greater than 0 wt % and less than 5.0 wt %, acetic acid in an amount of greater than 0 wt % and less than 10.0 wt %, and a surfactant in an amount of greater than 0 wt % and less than 1.0 wt %. The remaining composition of the entire etching solution may include water.

Since the glass is dipped in the etching solution, the etching process may be performed on both surfaces of the glass.

The transmittance of the glass before the patterning and the transmittance of the glass patterned by performing the wet etching method according to each embodiment were measured.

FIGS. 2 to 6 are graphs showing results of repeating the wet etching method according to first to fifth embodiments.

Figure 2:
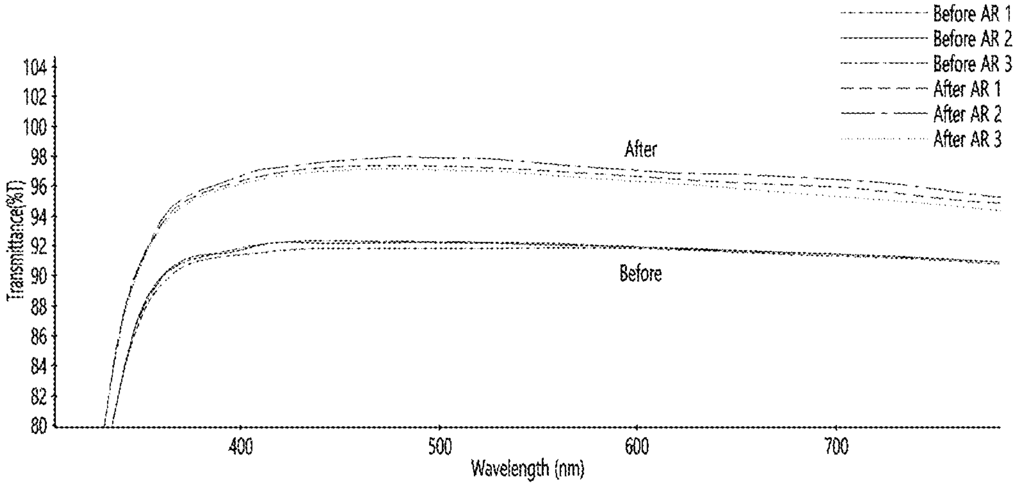
FIGS. 2 to 6 are graphs showing results of repeating a wet etching method according to first to fifth embodiments, respectively.
Figure 3:
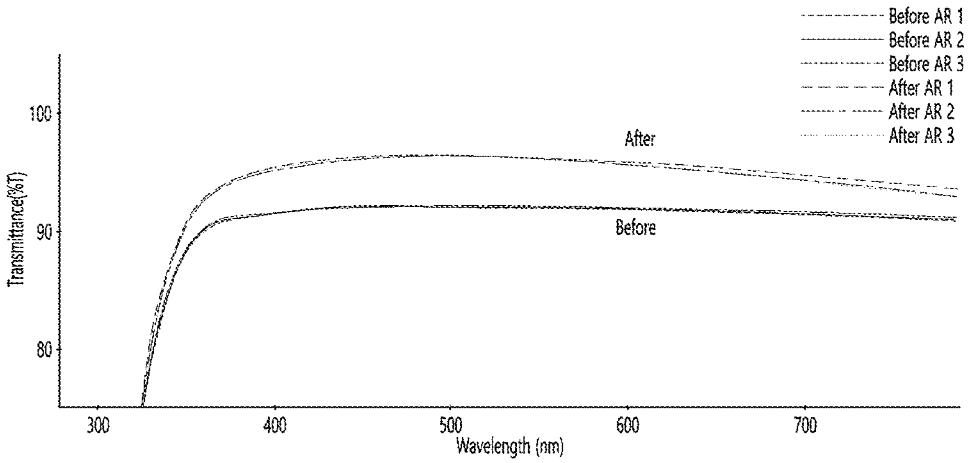
Figure 4:
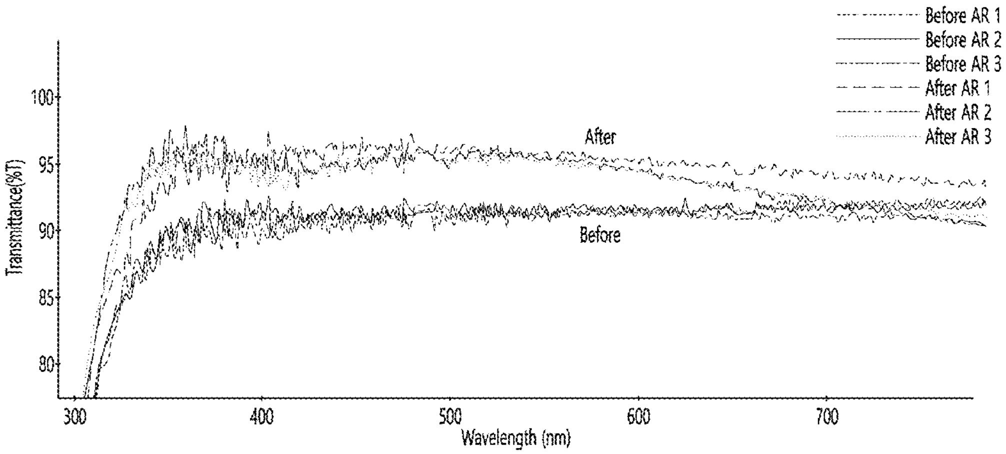
Figure 5:
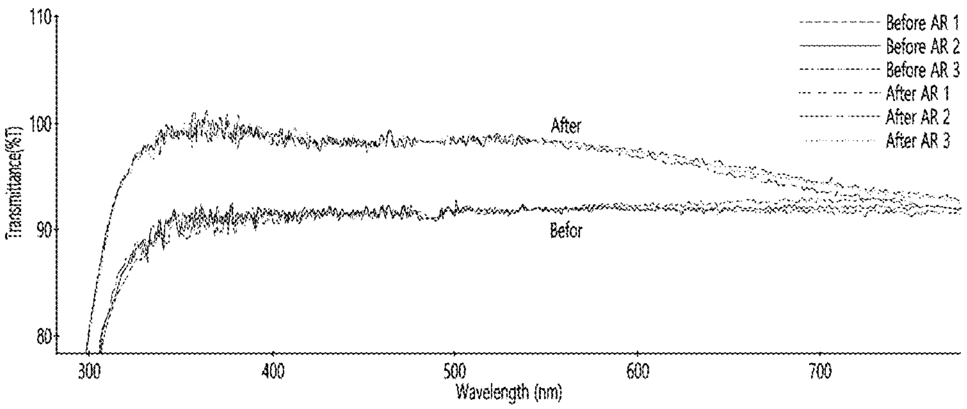
Figure 6:
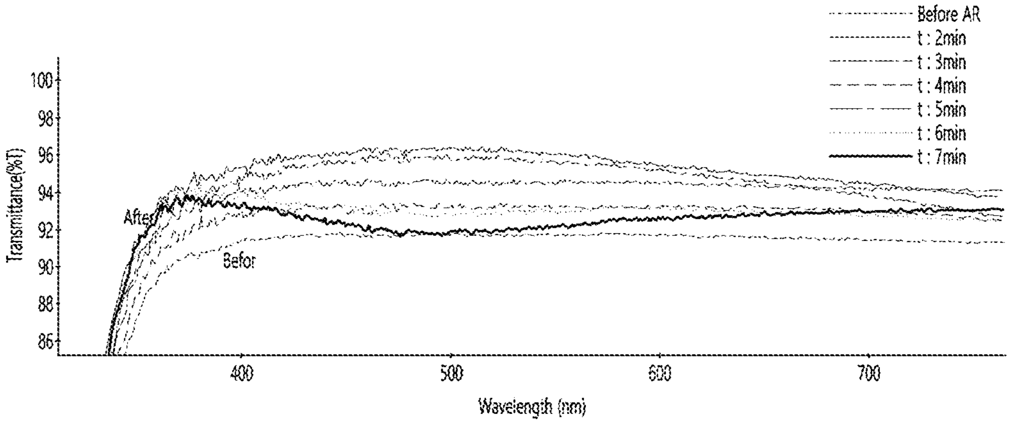

According to an embodiment, in Example 1 of the wet etching method of FIG. 2, it can be seen that the transmittance at 550 nm is improved by 5% from 92% to 97%. In Example 2 of the wet etching method of FIG. 3, it can be seen that the transmittance at 550 nm is improved by 4% from 92% to 96%. In Example 3 of the wet etching method of FIG. 4, it can be seen that the transmittance at 550 nm is improved by 4% from 91.5% to 95.5%. In Example 4 of the wet etching method of FIG. 5, it can be seen that the transmittance at 550 nm is improved by 6% from 92% to 98%. In Example 5 of the wet etching method of FIG. 6, it can be seen that the transmittance at 550 nm is improved by 4.3% from 91.7% to 96%.

As described above, it can be seen that the transmittance of the glass on which the wet etching method of the embodiment is performed is improved. For example, since the reflectance is lowered when the transmittance is improved, information visibility of a user of a mobile device may be improved and eye fatigue may be reduced.

Figure 7:
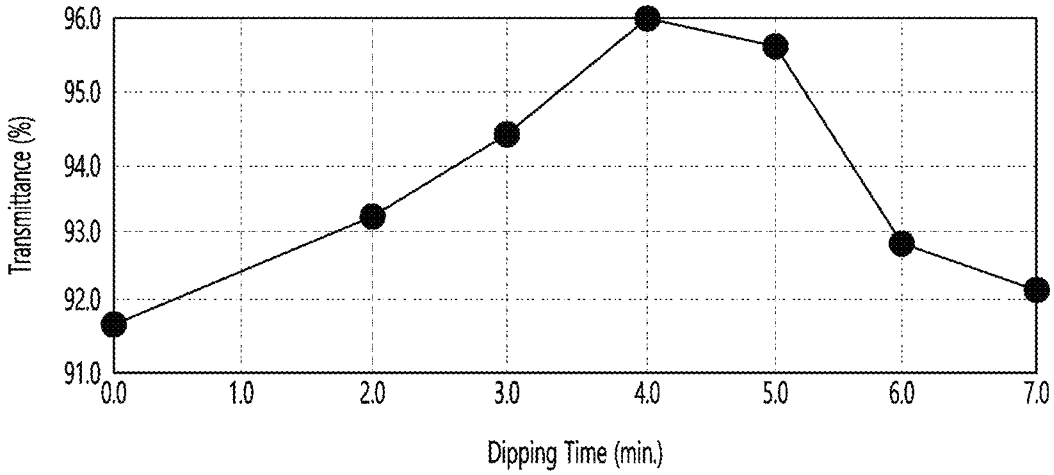
FIG. 7 is a graph showing a change in transmittance according to a dipping time.

FIG. 7 is a graph showing a change in transmittance according to a dipping time in Example 5.

Referring to FIG. 7, the transmittance of a sample having a longer dipping time is further improved. However, the transmittance peaks at 96% at 4 minutes. If the dipping time is insufficient, the etching reaction may be insufficient. Thus, the transmittance improvement may be insufficient as the formation of the nano-structure is insufficient.

If the dipping time is longer than 4 minutes, the transmittance may decrease again. This is because, after the oxides of sodium and potassium present on the surface of the glass are consumed by the reactions of Formulae 1 and 2, $SiO_2$ forming the protrusion is etched by the reaction of Formula 3. Therefore, it can be understood as a phenomenon that occurs because the $SiO_2$ protrusion forming the unevenness becomes smaller and the depth of the valley portion decreases. That is, as the height of the protrusion already formed decreases, the depth of the valley portion decreases again. In other words, it may be a phenomenon that occurs due to the lack of a protrusion role as in FIG. 9. In an embodiment, a wet etching temperature may be 60° C. Referring to FIG. 7 (Example 5), it can be seen that the dipping time has to be within 7 minutes.

Figure 8:
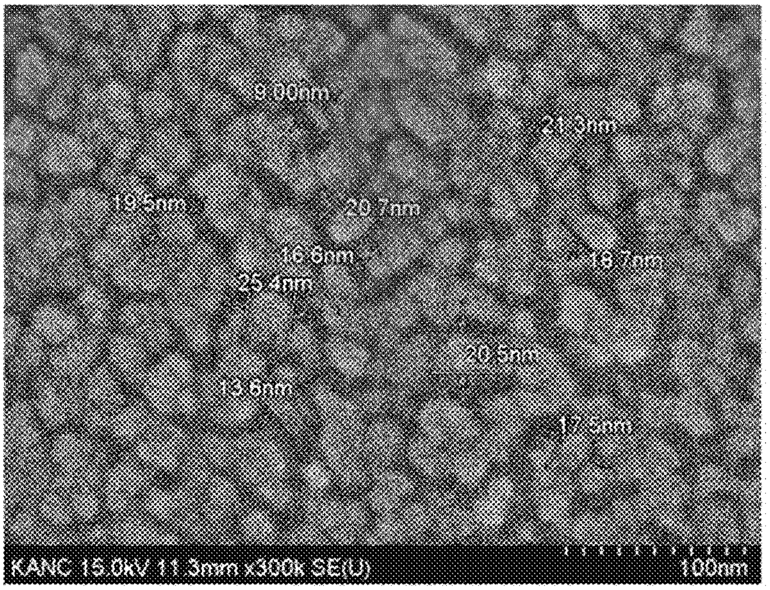
FIG. 8 is a photograph showing a surface (a) and a cross-section (b) of a glass on which a wet etching method of an embodiment is performed.
Figure 8:
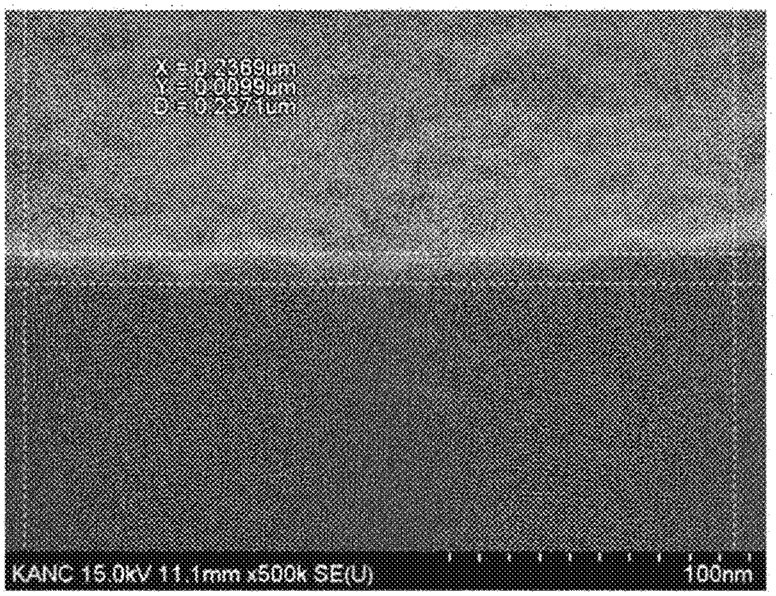

FIG. 8 is a photograph showing a surface (a) and a cross-section (b) of a glass on which a wet etching method of an embodiment is performed.

Referring to FIG. 8, it can be seen that the thickness of the protrusion in FIG. 8(*a*) ranges from several nanometers to several tens of nanometers. it can be seen that the depth of the protrusion in FIG. 8(*b*) ranges from several nanometers to several tens of nanometers.

Referring to FIG. 8, the nanoscale mentioned in the embodiment may correspond to both the thickness and the depth of the unevenness. The unevenness may include a protrusion and a groove portion. The protrusion may have a thickness of 1-50 nanometers. Preferably, the protrusion may having a thickness of 5-30 nanometers. When the thickness of the protrusion is 1-50 nanometers, the depth of the protrusion may be 1-50 nanometers. When the thickness of the protrusion is 5-30 nanometers, the depth of the protrusion may be 5-30 nanometers. The nanoscale structure within the range of several nanometers to several tens of nanometers in the above number exhibits the high transmittance/low reflectance effect according to the same principle as in FIG. 9.

The thickness (width) of the protrusion may be greater than the depth of the protrusion. Therefore, even if an external object repeatedly contacts a touch panel, the performance degradation of the reflectance may not occur. For example, breakage and collapse of the protrusion may not occur due to contact.

As a comparative example, a moth eye structure having a protrusion having a depth of several hundred nanometers (100-500 nanometers) and a thickness of several tens of nanometers (1-99 nanometers) is vulnerable to repetitive external impacts. Therefore, the reflectance of the glass shows a significant change with time, and the effect of improving the reflectance is lowered. As a result, such a glass is difficult to be used in an environment with severe contact and exposure to the external environment.

Figure 9:
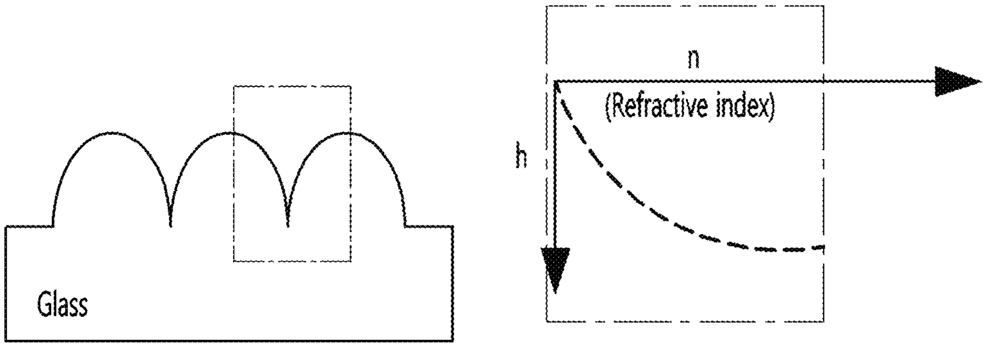
Figure 10:
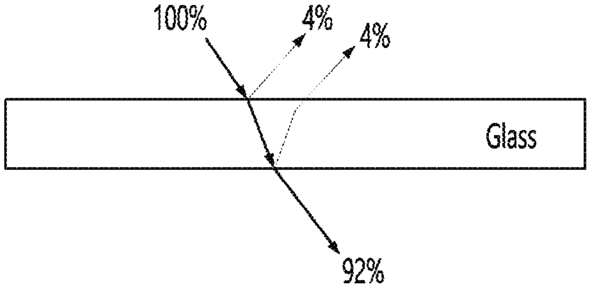
Figure 10:
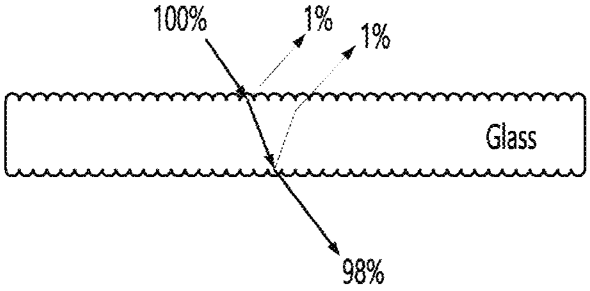

FIGS. 9 and 10 are views describing an operation of a moth eye structure applied to an embodiment, wherein FIG. 9 shows the operation principle of the moth eye structure, and FIG. 10 is a view describing the operation of improving transmittance and reducing reflectance by the moth eye structure according to Example 4.

The reflection of light is caused by a difference in refractive index at the interface of different media through which light passes. Referring to FIG. 9, there is a difference in refractive index with respect to light incident on the glass at the interface between the air and the glass having a nanostructure formed on the surface. In other words, the refractive index gradually increases from 1.0, which is the refractive index of the air, to 1.5, which is the refractive index of the glass. For this reason, as the reflectance decreases, the transmittance also increases.

Referring to FIG. 10, in the case (b) in which the nanoscale pattern is formed, reflected light may be significantly reduced, compared with the case (a) in which the pattern is not formed. The nanoscale pattern may be provided on both surfaces of the glass. If only one of the glass is required, masking for excluding an etching reaction on one surface may be performed, and then dipping may be performed.

Figure 11:
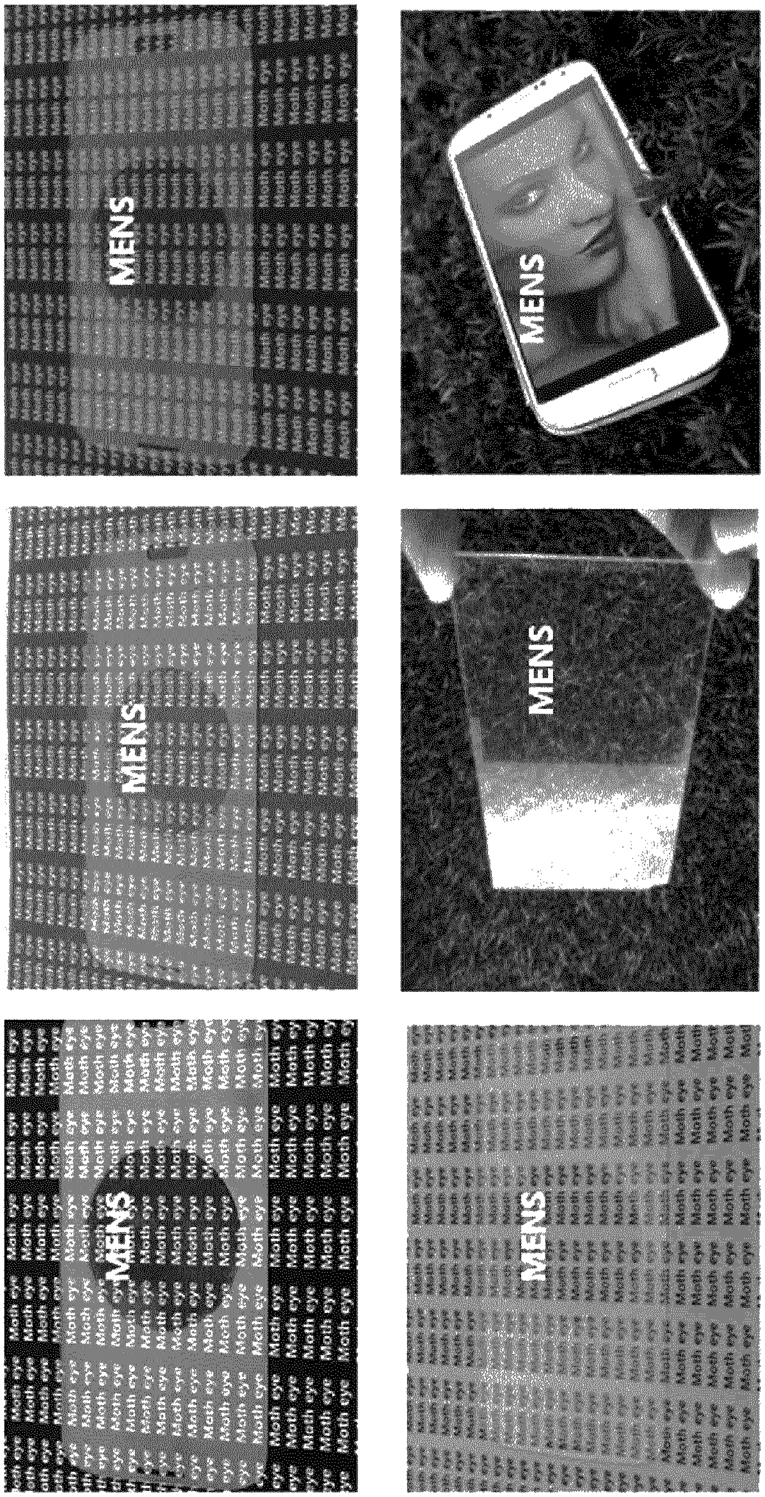
FIG. 11 is a photograph describing a high transmission/low reflection effect of a glass on which a nanoscale pattern is formed, according to an embodiment.

FIG. 11 is a photograph describing the high transmission/low reflection effect of the glass on which the nanoscale pattern is formed, according to an embodiment.

FIG. 11 is a photograph taken under sunlight. Referring to this, it can be seen that a bottom image of a nano-patterned portion is seen much more clearly by the high transmission/low reflection effect. In addition, it can be seen that the screen of the nano-patterned portion of the cover glass of the mobile device is seen clearly. In the drawing, MENS means a moth eye nano-structure.

The glass having high transmittance/low reflectance according to the present disclosure may be preferably used as the cover glass of the mobile device. However, the present disclosure is not limited thereto, and may be applied to various other fields.

For example, the glass according to the present disclosure may be applied to an outermost cover of a flat panel display (FPD), and specifically, to a front panel of a tablet PC, a TV, a CCTV, a monitor, a kiosk, an ATM, and a digital information display (DID). In addition, the glass according to the present disclosure may be applied to a center information display (CID), a navigation, and a rear seat entertainment (RSE) of automobiles. The glass according to the present disclosure may also be applied to a lens or window of a camera, a telescope, and a microscope. In addition, the glass according to the present disclosure may be applied as an encapsulating cover of a UVLED, an OLED, and the like. In addition, the glass according to the present disclosure may be applied to an electronic board, a display stand glass, a view port, a picture frame, a military optical device, a solar cell, and the like.

INDUSTRIAL APPLICABILITY

According to the present disclosure, high transmittance/low reflectivity can be realized by wet etching for various glasses. Therefore, the performance of various electronic devices including various displays and optical components can be improved, and user convenience can also be improved.

According to the present disclosure, it is possible to obtain a glass having high transmittance/low reflectance, in which the stability, reproducibility, and etching uniformity of an etching reaction are improved.

The invention claimed is:

1. A nano wet etching method of a glass, comprising:
cleaning the glass;
forming a nanoscale pattern by wet-etching the cleaned glass; and
cleaning and drying the nano-patterned glass,
wherein a wet etching solution used in the wet etching includes hydrofluoric acid, a surfactant, oxalic acid, and acetic acid,
wherein the hydrofluoric acid is included in an amount of greater than 0 wt % and less than 5.0 wt %,
wherein the oxalic acid is included in an amount of greater than 0 wt % and less than 5.0 wt %,
wherein the acetic acid is included in an amount of greater than 0 wt % and less than 10.0 wt %, and
wherein the surfactant is included in an amount of greater than 0 wt % and less than 1.0 wt %.

2. The nano wet etching method of claim 1,
wherein the wet etching is performed by a dipping method, so that the nanoscale pattern is formed on at least one surface of the glass.

3. The nano wet etching method of claim 1,
wherein the nanoscale pattern has a range of 1-100 nanometers, and
wherein the nanoscale pattern is a moth eye structure including a protrusion protruding from a surface of the glass.

4. The nano wet etching method of claim 3,
wherein a protrusion thickness is 1-50 nanometers, and
wherein a protrusion depth is 1-50 nanometers.

5. The nano wet etching method of claim 3,
wherein a protrusion thickness is 5-30 nanometers, and
a protrusion depth is 5-30 nanometers.

6. The nano wet etching method of claim 3,
wherein the protrusion thickness is greater than the protrusion depth.

7. The nano wet etching method of claim 1,
wherein the wet etching solution composition in the wet etching does not include at least one of $NH_4F$, $HNO_3$, $H_3PO_4$, and HCl.

8. The nano wet etching method of claim 1,
wherein the wet etching solution composition in the wet etching does not include all of $NH_4F$, $HNO_3$, $H_3PO_4$, and HCI.

9. The nano wet etching method of claim 1,
wherein a wet etching temperature is 30-70° C., and
wherein an etching time is 1-7 minutes.

10. A glass manufactured by the nano wet etching method of the glass according to claim 1.

11. A wet etching solution composition for etching a glass, comprising:
hydrofluoric acid in an amount of greater than 0 wt % and less than 5.0 wt %;
oxalic acid in an amount of greater than 0 wt % and less than 5.0 wt %;
acetic acid in an amount of greater than 0 wt % and less than 10.0 wt %;
a surfactant in an amount of greater than 0 wt % and less than 1.0 wt %; and water as a remainder.

12. The wet etching solution composition of claim 11,
wherein the wet etching solution composition does not include at least one of $NH_4F$, $HNO_3$, $H_3PO_4$, and HCl.

13. The wet etching solution composition of claim 11,
wherein the amount of the acetic acid is larger than the amount of the oxalic acid.

* * * * *